US009683488B2

(12) United States Patent
Ress, Jr. et al.

(10) Patent No.: US 9,683,488 B2
(45) Date of Patent: Jun. 20, 2017

(54) GAS TURBINE ENGINE IMPELLER SYSTEM FOR AN INTERMEDIATE PRESSURE (IP) COMPRESSOR

(71) Applicants: Rolls-Royce North American Technologies, Inc., Indianapolis, IN (US); Rolls-Royce PLC, London (GB)

(72) Inventors: Robert A. Ress, Jr., Carmel, IN (US); Andrew Swift, Uttoxeter (GB)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 658 days.

(21) Appl. No.: 14/137,453

(22) Filed: Dec. 20, 2013

(65) Prior Publication Data

US 2014/0248142 A1 Sep. 4, 2014

Related U.S. Application Data

(60) Provisional application No. 61/771,673, filed on Mar. 1, 2013.

(51) Int. Cl.
*F01D 9/02* (2006.01)
*F02C 3/08* (2006.01)
*F04D 29/44* (2006.01)
*F04D 29/62* (2006.01)
(Continued)

(52) U.S. Cl.
CPC .............. *F02C 3/08* (2013.01); *F01D 11/005* (2013.01); *F04D 29/162* (2013.01); *F04D 29/444* (2013.01); *F04D 29/624* (2013.01); *F05D 2240/12* (2013.01); *F05D 2240/581* (2013.01); *Y10T 29/49243* (2015.01)

(58) Field of Classification Search
CPC .... F02C 7/28; F02C 3/08; F01D 9/065; F01D 11/005; F04D 29/083; F04D 29/444; F04D 29/624; F04D 29/162
See application file for complete search history.

(56) References Cited

U.S. PATENT DOCUMENTS 3,478,955 A * 11/1969 Kunderman .......... F01D 17/143
                                                 415/158
4,248,566 A    2/1981 Chapman et al.
4,687,412 A    8/1987 Chamberlain
(Continued)

OTHER PUBLICATIONS

International Search Report for PCT/US2013/073197 mailed Apr. 22, 2014.

*Primary Examiner* — Gregory Anderson
*Assistant Examiner* — Maxime Adjagbe
(74) *Attorney, Agent, or Firm* — Fishman Stewart PLLC (57) ABSTRACT

A gas turbine engine includes a compressor assembly that is rotationally coupled to a shaft, the compressor assembly having a centrifugal impeller and a shroud covering a bladed portion of the centrifugal impeller. The compressor assembly includes a diffuser that is attached to the shroud via a pair of flanges, the diffuser including a strut that is mounted through an aft-extending leg to a base of an intercase. A sealing assembly is attached to the diffuser and is attachable to a transition duct that is positioned to receive air from the diffuser. The sealing assembly is configured to prevent air from passing through the sealing assembly while allowing relative motion to occur between the transition duct and the diffuser.

20 Claims, 5 Drawing Sheets

(51) Int. Cl.
*F01D 11/00* (2006.01)
*F04D 29/16* (2006.01)

(56) References Cited

U.S. PATENT DOCUMENTS

| | | | |
|---|---|---|---|
| 5,071,262 A * | 12/1991 | Monzel | F01D 25/164 384/581 |
| 5,555,721 A | 9/1996 | Bourneuf et al. | |
| 5,618,162 A | 4/1997 | Chan et al. | |
| 5,997,244 A | 12/1999 | Gebre-Giorgis et al. | |
| 6,506,015 B2 | 1/2003 | Nagata et al. | |
| 7,329,088 B2 | 2/2008 | Barrett et al. | |
| 7,363,762 B2 | 4/2008 | Montgomery et al. | |
| 7,841,187 B2 * | 11/2010 | Behaghel | F01D 5/046 415/115 |
| 7,908,869 B2 | 3/2011 | Ivakitch et al. | |
| 8,075,261 B2 | 12/2011 | Merry et al. | |
| 2005/0242522 A1 * | 11/2005 | Lejars | F01D 11/005 277/584 |
| 2007/0036646 A1 * | 2/2007 | Nguyen | F04D 29/4206 415/208.3 |

\* cited by examiner

GAS TURBINE ENGINE IMPELLER SYSTEM FOR AN INTERMEDIATE PRESSURE (IP) COMPRESSOR

CROSS-REFERENCE TO RELATED APPLICATIONS

This application claims priority to U.S. Provisional Patent Application No. 61/771,673, filed Mar. 1, 2013, the contents of which are hereby incorporated in their entirety.

FIELD OF TECHNOLOGY

An improved centrifugal compressor assembly for a turbofan engine is disclosed, and more particularly, an improved isolated shroud mounting arrangement is disclosed for a centrifugal compressor.

BACKGROUND

This relates to gas turbine engine compression system designs. More particularly, in one example compressor sections employing a centrifugal impeller. The mechanical arrangement includes an isolated shroud mounting that minimizes clearance between the impeller blades and the static impeller shroud.

Gas turbine engines such as those used as aircraft propulsion units include turbojet and turbofan types. A turbofan engine includes a fan section, a compression section, a combustion section, a high pressure turbine section and a low pressure turbine section. The fan section is coupled to the low pressure turbine section while the compression section is coupled to the high pressure turbine section. The compression section together with the combustion section and the high pressure turbine section form the core of the engine. The compression section can be a single unit driven by the high pressure turbine or it may be split into an intermediate pressure compressor section followed by a high pressure compressor section driven by an intermediate pressure turbine and a high pressure turbine respectively. The compression sections can include axial compression stages, centrifugal stages or a combination of both.

It has become increasingly desirable to provide improved compressor performance by reducing the amount of air leakage in compressors of turbofan engines including those employing centrifugal stages. The centrifugal compressor typically includes a centrifugal impeller having blades that are enshrouded by a static impeller shroud. Minimizing the clearance between the impeller blades and the impeller shroud optimizes the capacity of the impeller in pressurizing air to the elevated pressures desired for peak engine performance.

The shroud for a centrifugal compressor is typically mounted to an adjacent compressor casing if present, or to a downstream diffuser assembly. The compressor casing or diffuser assembly is mounted to a support frame or other static component. The support frame or casing structure typically forms part of the structural backbone of the engine. This type of shroud mounting can be problematic in that carcass distortions resulting from asymmetric structural loading (e.g., from take-off rotation, maneuver, and landing) are transmitted to the shroud, resulting in a greater than desired impeller tip clearance.

Shrouds are typically designed having adequate clearance such that interference does not occur during the most extreme anticipated carcass distortions that can occur during engine operation, due to mechanical loading, thermal loading, component wear, and the like. Thus, distortion that occurs in the shroud during engine operation can increase component clearance, resulting in excess air leakage in the compressor, leading to overall poor engine performance. Reducing the propensity for shroud distortion would be desirable and could improve compressor performance.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Exemplary illustrations of a shroud for a centrifugal compressor are described herein and shown in the attached drawings. Exemplary assemblies include a compressor assembly that is rotationally coupled to a shaft, the compressor assembly having a centrifugal impeller and a shroud covering a bladed portion of the centrifugal impeller. The compressor assembly includes a diffuser that is attached to the shroud via a pair of flanges, the diffuser including a strut that is mounted through an aft-extending leg to a base of an intercase. A sealing assembly is attached to the diffuser and is attachable to a transition duct that is positioned to receive air from the diffuser. The sealing assembly is configured to prevent air from passing through the sealing assembly while allowing relative motion to occur between the transition duct and the diffuser.

Another exemplary illustration includes a method of manufacturing a gas turbine engine that includes attaching a centrifugal impeller of a compressor to a rotational shaft, covering a bladed portion of the centrifugal impeller with a shroud, attaching a diffuser to the shroud via a pair of flanges, and attaching the diffuser to an intercase via a strut that is mounted through an aft-extending leg to a base of the intercase. The method also includes coupling the diffuser to a transition duct via a sealing assembly, wherein the sealing assembly is configured to prevent air from passing through the sealing assembly while allowing relative motion to occur between the transition duct and the diffuser.

The disclosed shroud mounting scheme provides a structural loop of comparable axial lengths from the bearing through both rotating and static structures, resulting in improved impeller tip clearance control. The disclosed shroud cover and forward piston ring seal arrangement allow for implementation of an inducer bleed system into a three spool turbofan engine, resulting in improved system operability. The forward piston ring seal arrangement reduces or eliminates distortion in the shroud, resulting in improved impeller tip clearance control. The shroud and radial diffuser mounting scheme results in a modular engine architecture, resulting in improved build and maintenance, including on-wing change-out of impeller hardware. Other aspects of the disclosure will become apparent and are set forth below.

Figure 1:
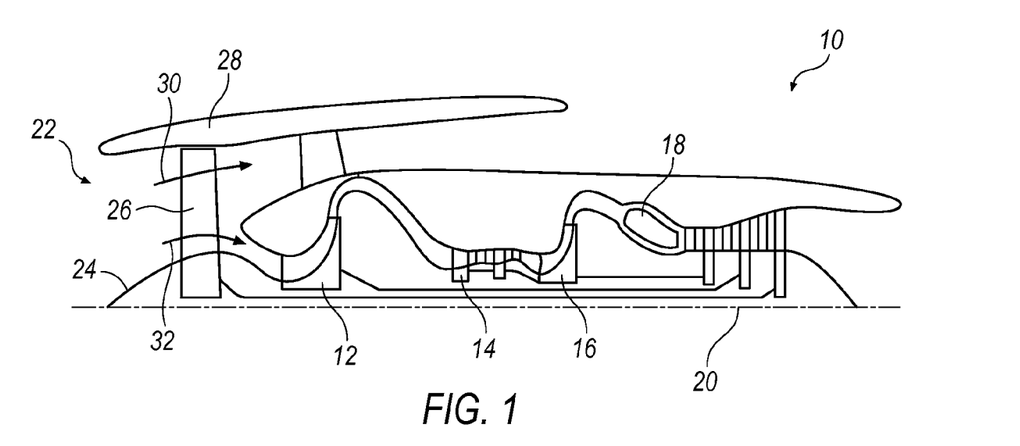
FIG. 1 illustrates a side schematic view of a gas turbine engine employing the improvements discussed herein.

Turning now to the drawings, FIG. 1 illustrates a schematic diagram of a gas turbine machine 10 utilizing the improvements disclosed herein. The gas turbine machine 10 includes a first centrifugal compressor 12, an axial compressor 14, a second centrifugal compressor 16, a combustor 18, and a turbine 20. A fan 22 includes a nosecone assembly 24, blade members 26, and a fan casing 28. Blade members 26 direct low pressure air to a bypass flow path 30 and to the compressor intake 32, which in turn provides airflow to compressor 12. The nosecone assembly 24 generates turbulent airflow, which in turn is directed across the surface of the blade member 26.

Figure 2:
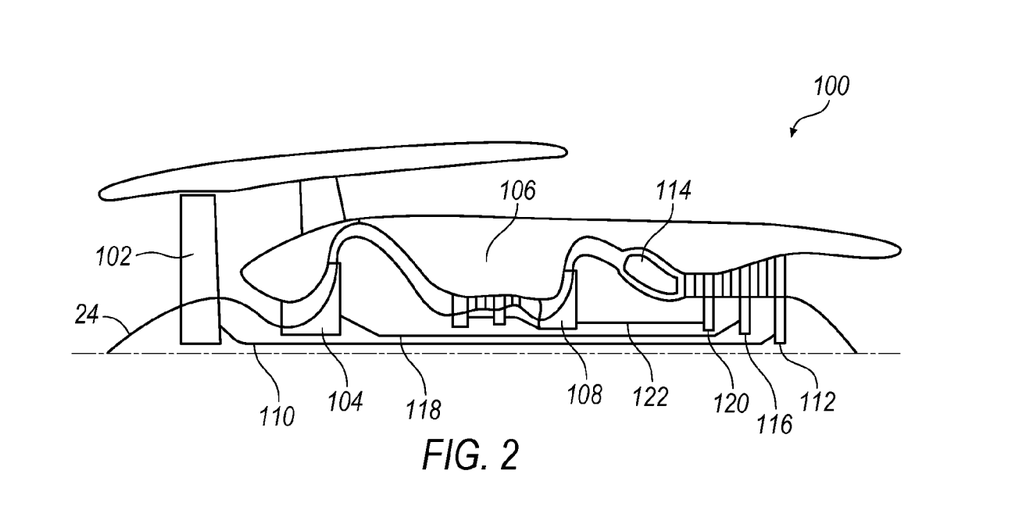
FIG. 2 illustrates a 3-spool turbofan engine with centrifugal compression system employing the improvements discussed herein.

FIG. 2 illustrates a schematic diagram of a three spool turbofan engine 100. Turbofan 100 includes a fan 102 coupled to a low pressure turbine (LPT) 112 through shaft 110, a single-stage centrifugal compressor assembly 104 coupled to an intermediate pressure turbine (IPT) 116 through shaft 118. Turbofan 100 includes a two-stage axial compressor assembly 106 and a single-stage centrifugal compressor 108 coupled to a high pressure turbine 120 through shafting 122. Turbines 120, 116, and 112 are driven by hot gases discharged from a combustion chamber 114.

Figure 3:
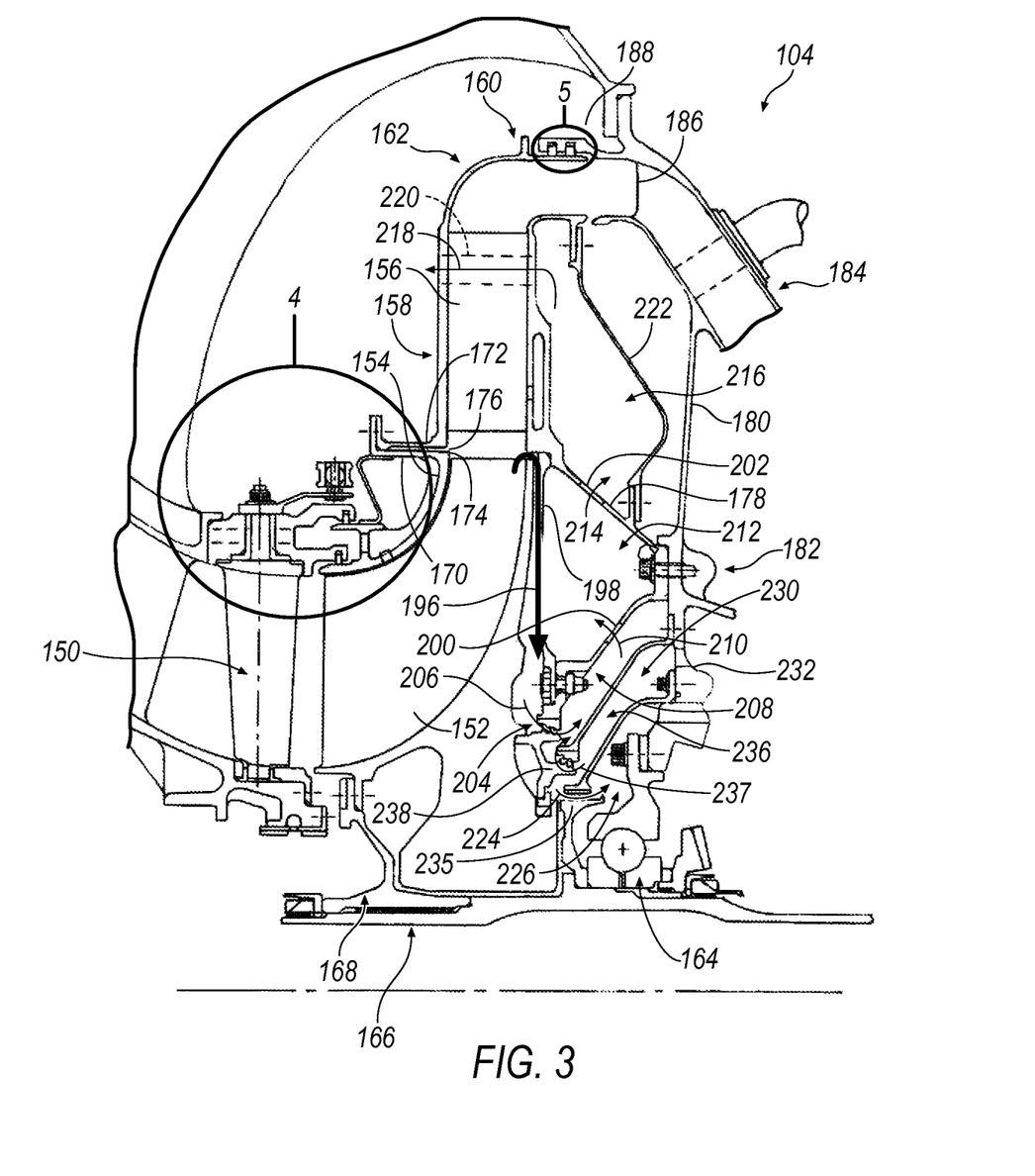
FIG. 3 illustrates an intermediate pressure compression system employing the improvements discussed herein.

FIG. 3 illustrates the single stage centrifugal compressor assembly 104 of FIG. 2. Referring to FIG. 3, single-stage centrifugal compressor assembly 104 includes a variable inlet guide vane 150, impeller 152, a shroud 154, and a diffuser 156. Diffuser 156 includes a radial component 158 and an axial component 160 that is formed through an elbow 162. Axial component 160 of diffuser 156 is generally orthogonal to radial component 158. Impeller 152 is located through a thrust bearing 164 mounted on a shaft 166, which is driven through a splined stub shaft 168.

Shroud 154 and diffuser 156 are coupled through a pair of cylindrical legs or flanges 170, 172 that extend from a tip 174 of shroud 154 and a tip 176 of a base of diffuser 156. Diffuser 156 is mounted through an aft-extending conical leg or strut 178 and to a base of an intercase 180 at flange 182. The area including flange 182 is generally free from distortions and is therefore a stable region from which to locate and support diffuser 156 and shroud 154. Shroud 154 is therefore structurally supported and generally distortion free via its connection through aft-extending conical leg 178 and flanges 170, 172.

Figure 5:
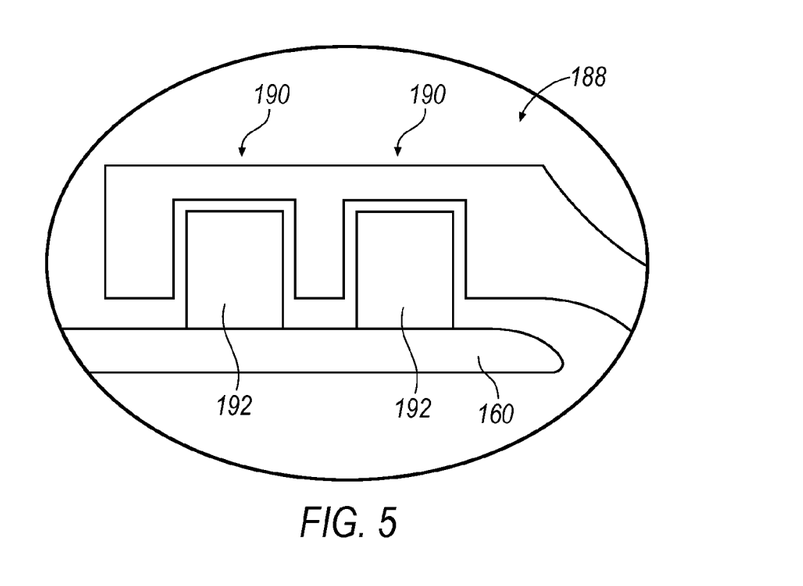
FIG. 5 illustrates a piston ring assembly.

A transition duct 184 is attached to an outlet 186 of axial component 160 of diffuser 156, and passes compressed air from compressor assembly 104 to two-stage axial compressor assembly 106, as illustrated in FIG. 2. Transition duct 184 is subject to large loads during operation, from high pressure operation of gases as well as from g-loading during maneuvering and other operations of turbofan engine 100. As such, a piston ring assembly 188 (FIG. 5) is positioned between axial component 160 of diffuser 156, and transition duct 184. Piston ring assembly 188 includes one or more cylindrical bores 190 in transition duct 184, and corresponding piston rings 192. The piston ring geometry could be a step cut design to minimize thru seal leakage. The decoupled arrangement at the piston ring assembly 188 isolates motion of diffuser 156 from transition duct 184, which thereby isolates shroud 154 and diffuser 156 from the structural load path and subsequent distortions of the fan frame and intercase assembly.

Bearing 164 is mounted to a base of the intercase below and near an axial plane of the diffuser mount flange 182. This arrangement allows a tight tip clearance to be held between rotating impeller 152 and static shroud 154, because the structure and thermal loop from the location bearing 164 through both the rotating and static structure is of similar axial length. As such, proper selection of materials and management of internal flows allows matching of the thermal growth of the two structural loops, thereby facilitating tight clearance.

More specifically, airflow 196 aft of impeller 152 passes between impeller 152 and stationary structure 198. Airflow 196 is vented via apertures 200, 202 by way of a knife-edge seal 204. That is, airflow 196 passes 206 into a first chamber 208 via seal 204, airflow 196 passes 210 to a second chamber 212 via aperture 200, airflow 196 passes 214 to a third chamber 216, and is bled 218 via a passageway 220 that passes through diffuser 156 but without mixing with air that passes through diffuser 156. Chamber 216 is formed in part by a wall 222 that is a non-load-bearing wall attached to diffuser 156 and is attached to strut 178, such that chamber or enclosure 216 is formed at least in part by diffuser 156, the non-load-bearing wall 222, and the strut 178, wherein the air that passes through the aperture 214 passes into the enclosure 216.

Secondary airflow 230 is bled from a downstream compressor stage and passes through aperture 232 into chamber 236. This airflow splits with a portion passing 224 into bearing chamber 226 via seal 235. A second portion passes 237 into chamber 208 via seal 238. Airflow 196 and the second portion of 230 mix in chamber 208 and ultimately discharge through passageway 220. In such fashion, air is bled aft the impeller via two paths as described while a structural path for support of diffuser 156 is provided. Passageway 220 is an axial pass-through that allows bleed or a pass-through of air 218 but without mixing with air that passes through diffuser 156 and directly from the compressor assembly.

Thus, relative motion between impeller 152 and shroud 154, and between impeller 152 and diffuser 156, is minimized at least because diffuser 156 is mounted to bearing support structural component 182. This is because motion of transition duct 184 is isolated from diffuser 156 via piston ring assembly 188, and because axial lengths of components between stationary and rotating components are thermally similar, and because pressure build-up from airflow 196 passing aft of impeller 152 is bled through apertures 200, 202, and 220.

Compressor assembly 104 may be manufactured by attaching centrifugal impeller 152 of compressor assembly 104 to a rotational shaft 166, covering a bladed portion of the centrifugal impeller 152 with shroud 154, and attaching diffuser 156 to shroud 154 via flanges 172, 174. Diffuser 156 is attached to intercase 180 via a strut 178 that is mounted as an aft-extending leg to a base of the intercase. Diffuser 156 is coupled to a transition duct 184 via sealing assembly 188, wherein sealing assembly 188 is configured to prevent air from passing through sealing assembly 188 while allowing relative motion to occur between transition duct 184 and diffuser 156.

Figure 4:
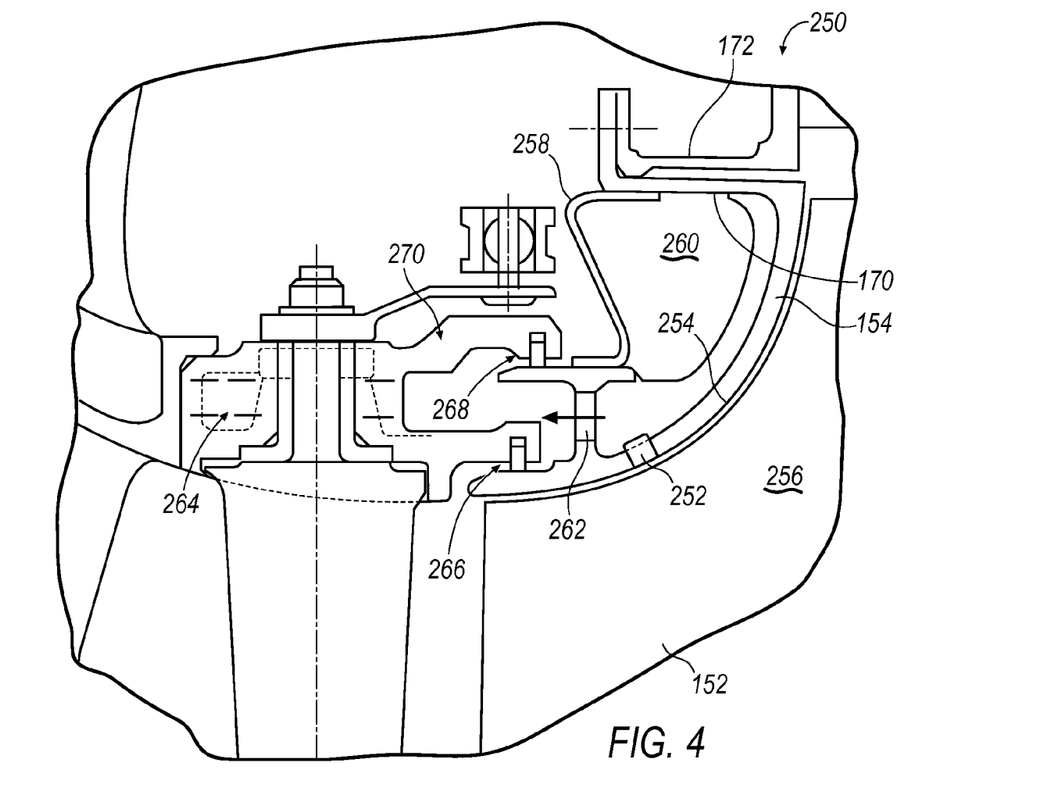
FIG. 4 illustrates a fan frame to shroud interface employing the improvements discussed herein.

The IP compressor incorporates an inducer bleed to allow an outflow of air at part speed operation for enhanced part speed stability, while allowing an inflow of air during high speed operation for additional flow capacity. Referring to FIG. 4, an inducer bleed system 250 is illustrated therein. Inducer bleed system 250 includes an inducer bleed slot 252. Inducer bleed slot 252 is a continuous slot within shroud 154 and is positioned along a meridional distance along the contoured surface 254 of shroud 154 and at such a location such that airflow flows outwardly for sub-maximum impeller rotation but airflow flows inwardly for near maximum and maximum impeller rotation. In one example, slot 252 is positioned at a 15 percent meridional point on shroud 154 to produce an airflow which flows outwardly from within inducer passages 256 to an upstream splitter cavity (not shown) for all speeds up to approximately 95 percent of the design speed. Above 95 percent of the design speed of the rotor assembly, the pressure differential is reversed from the bleed plenum 260 to the inducer passages 256 at the contoured wall 254 so that flow enters the inducer passages 256 through the continuous bleed slot 252. Full speed flow capabilities are enhanced by the bleed control slot positioned at the meridional point of the shroud over the impeller downstream of the inducer choke point where the compressor impeller produces an in-flow of gas through the slot at compressor speeds near the compressor design speed. Thus, under high speeds of operation impeller efficiency is improved because air is drawn as an inflow to inducer passages 256, but under conditions less than maximum speed, flow is stabilized at part speed phases of operation.

However, implementation of the inducer bleed system is challenging particularly to a three speed spool turbofan because of the aforedescribed internal flow needs and also because of assembly requirements of the engine. In addition and as also described, distortions with the static shroud should be minimized such that the tip clearance of the impeller is not compromised. As such, a bleed plenum is formed within shroud 154 by including a fastened or brazed, generally non-structural shroud cover 258. With the addition of shroud cover 258, an inducer bleed plenum 260 is formed such that air is bled or vented forward through inducer slot 252 and through an aperture 262 in shroud 154 into inlet guide vane (IGV) outer casing 270 via a passage 264 where air is vented to a splitter cavity (not shown). The splitter cavity is vented to either the core duct or the bypass duct. An interface is formed between the IGV outer casing and the shroud via piston ring seals 266, 268 (similar to those illustrated in FIG. 5) such that structural isolation of shroud 154 is accomplished by allowing relative motion therebetween, while providing gas seal via for instance a ring seal or other piston/bore seal as previously described. As such, the shroud is isolated from any distortions or differential thermal growth seen in the fan frame and the IGV outer casing.

Figure 6A:
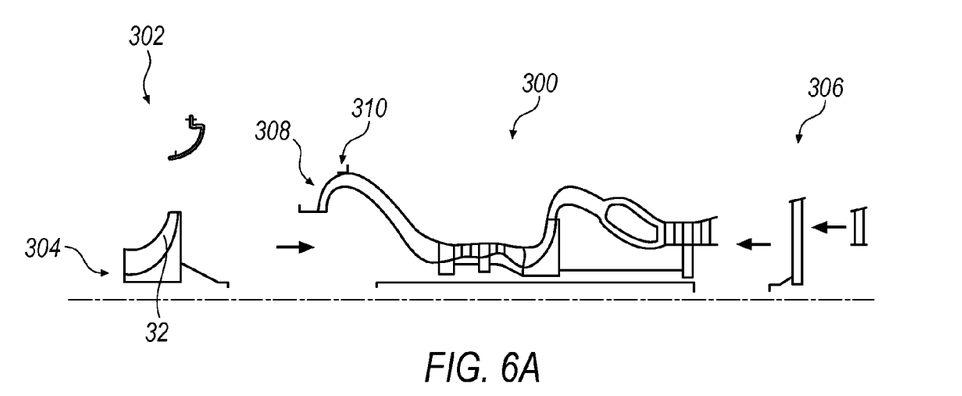
FIG. 6A illustrates modularized HP and IP component sub-assemblies.
Figure 6B:
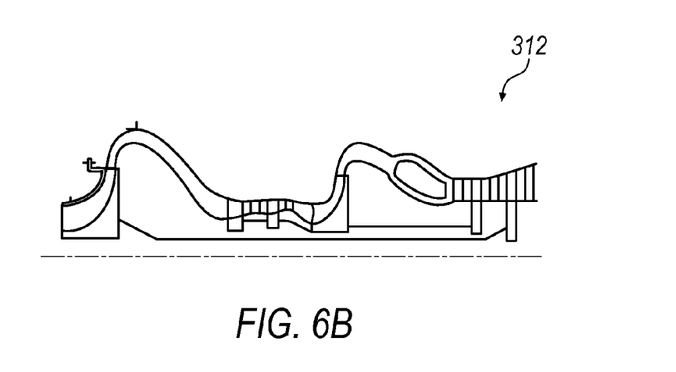
FIG. 6B illustrates the modularized sub-assemblies of FIG. 5a in a completed HP/IP assembly.

The impeller shroud mount system 302/304 described herein allows for a fully modular engine architecture. Referring now to FIG. 6A, an HP/IP subassembly 300 is shown in which intermediate pressure compressor (IPC) rotor module 304 is joined to HP/IP subassembly 300 followed by joining shroud 302 to HP/IP subassembly 300. An IPT rotor module 306 is likewise joined to HP/IP subassembly 300. As shown in FIGS. 6A and 6B, diffuser assembly 308 is mated to the intercase by first engaging the outboard piston ring seals 310 as previously described, and subsequently seating and bolting a flange at the aft extending conical leg to the base of the intercase. The compressor rotor module 304 is mated to the LP shaft, and the static shroud 302 is bolted to the cylindrical leg extending forward from the base of the diffuser, and the IPT rotor module 306 is likewise attached.

Figure 7A:
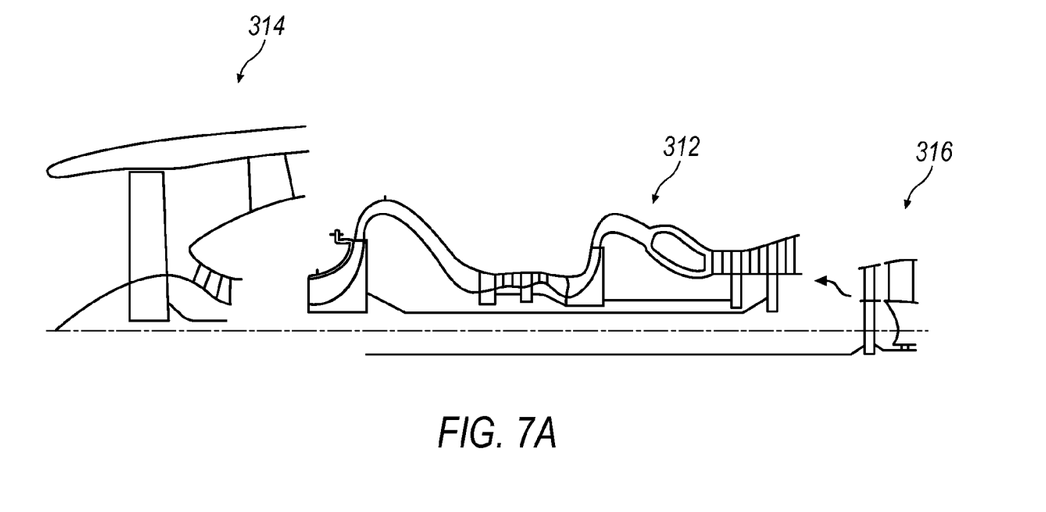
FIG. 7A illustrates engine module sub-assemblies.
Figure 7B:
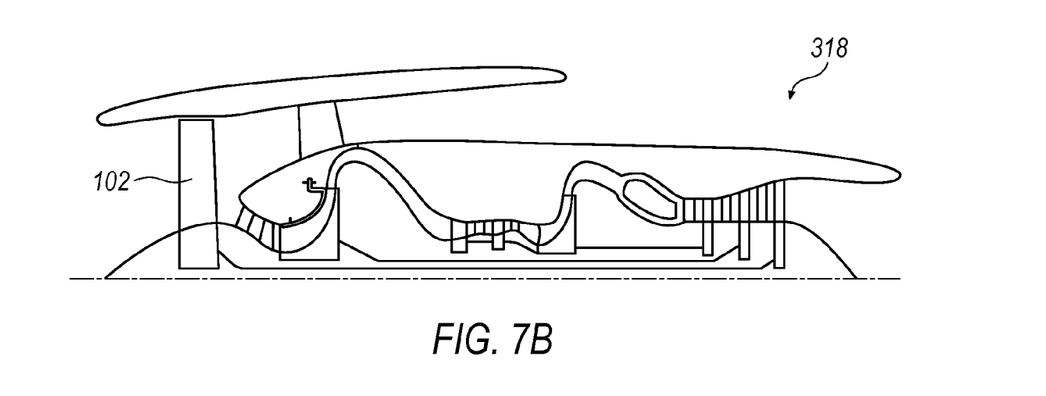
FIG. 7B illustrates the engine module sub-assemblies in a completed engine.

Referring to FIGS. 7A and 7B, the HP/IP module 312 completed as shown in FIG. 6B is mated to the fan module 314 and the LPT module 316 is added to complete the full engine build 318. When the HP/IP module 312 is mated to the fan module 314, piston rings housed in the IGV outer casing engage the forward end of the static shroud. Thus, the modular arrangement allows for on-wing removal of the HP/IP and LPT modules to service the IPC impeller and shroud in situ.

A method of manufacturing a gas turbine engine will now be described. The method includes attaching a centrifugal impeller of a compressor to a rotational shaft, covering a bladed portion of the centrifugal impeller with a shroud, attaching a diffuser to the shroud via a pair of flanges, attaching the diffuser to an intercase via a strut that is mounted through an aft-extending leg to a base of the intercase, and coupling the diffuser to a transition duct via a sealing assembly, wherein the sealing assembly is configured to prevent air from passing through the sealing assembly while allowing relative motion to occur between the transition duct and the diffuser.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

What is claimed is:

1. A gas turbine engine comprising:
   a compressor assembly rotationally coupled to a shaft, the compressor assembly having a centrifugal impeller;
   a shroud covering a bladed portion of the centrifugal impeller, the shroud having a first flange extending therefrom;
   a diffuser having a second flange extending therefrom that is parallel to and in direct contact with the first flange, the diffuser attached to the shroud via the first flange and the second flange, the diffuser including a strut that is mounted through an aft-extending leg to a base of an intercase; and
   a sealing assembly attached to the diffuser, wherein the sealing assembly is attachable to a transition duct that is positioned to receive air from the diffuser, and wherein the sealing assembly is configured to prevent air from passing through the sealing assembly while allowing relative motion to occur between the transition duct and the diffuser.

2. The gas turbine engine as claimed in claim 1, wherein the diffuser comprises a radial portion and an axial portion that is generally orthogonal to the radial portion, and wherein the sealing assembly is attached to the axial portion of the diffuser.

3. The gas turbine engine as claimed in claim 1, wherein the sealing assembly comprises at least one piston ring positioned in a cylinder, the piston ring is configured to slide relative to a wall of the cylinder and prevent air from passing while allowing the relative motion to occur.

4. The gas turbine engine as claimed in claim 1, further comprising an aperture in the strut and an axial pass-through in the diffuser, wherein air that passes through the aperture also passes through the axial pass-through but without mixing with air that passes through the diffuser and directly from the compressor assembly.

5. The gas turbine engine as claimed in claim 4, further comprising a non-load-bearing wall attached to the diffuser and attached to the strut, such that an enclosure is formed in part by the diffuser, the non-load-bearing wall, and the strut, wherein the air that passes through the aperture passes into the enclosure.

6. The gas turbine engine as claimed in claim 1, comprising a thrust bearing aft of the impeller, wherein a portion of the thrust bearing is structurally attached to the strut.

7. A gas turbine engine comprising:
a shaft;
a turbine assembly rotationally coupled to the shaft, the turbine assembly driven by hot gases discharged from a combustion chamber;
a compressor assembly rotationally coupled to the shaft, the compressor assembly having a centrifugal impeller for pressurizing and impelling air into the combustion chamber;
a mounting structure coupled to a case of the gas turbine engine;
a thrust bearing attached to the mounting structure and attached to the shaft such that the shaft is rotatable relative to the mounting structure;
an impeller shroud covering a bladed portion of the centrifugal impeller, the impeller shroud having a first flange extending therefrom along a first extension;
a radial diffuser having a second flange extending therefrom along a second extension, the first extension in contact with the second extension, the radial diffuser positioned to receive compressed air from the compressor assembly, the radial diffuser having the second flange and having a first strut attached to the mounting structure, wherein the first flange of the impeller shroud is directly attached to the second flange via the first and second extensions;
a transition duct positioned to receive compressed air from the radial diffuser, the transition duct having a second strut attached to the mounting structure; and
a piston ring seal coupled between the transition duct and the radial diffuser, the piston ring seal configured to prevent air from passing through the seal while allowing relative motion between the transition duct and the radial diffuser.

8. The gas turbine engine as claimed in claim 7, wherein the radial diffuser includes an elbow that directs the compressed air from passing in a radial direction to an axial direction, and wherein the piston ring seal is attached to the elbow.

9. The gas turbine as claimed in claim 7 wherein the piston ring seal comprises at least one piston ring positioned in a cylinder, the piston ring configured to slide relative to a wall of the cylinder and prevent the air from passing while allowing the relative motion to occur.

10. The gas turbine as claimed in claim 7 further comprising an aperture in the first strut and an axial pass-through in a radial portion of the radial diffuser, wherein air that passes through the aperture also passes through the axial pass-through but without mixing with air that passes through the radial portion of the radial diffuser and directly from the compressor assembly.

11. The gas turbine engine as claimed in claim 10, further comprising a non-load-bearing wall attached to an axial portion of the radial diffuser and attached to the first strut, such that an enclosure is formed in part by the axial portion of the radial diffuser, the non-load-bearing wall, and the first strut, wherein the air that passes through the aperture passes into the enclosure.

12. The gas turbine engine as claimed in claim 7, wherein the thrust bearing is positioned aft of the impeller.

13. A method of assembling a centrifugal compressor for a gas turbine engine comprising:
attaching a centrifugal impeller of a compressor to a rotational shaft;
covering a bladed portion of the centrifugal impeller with a shroud;
attaching a diffuser to the shroud via a pair of flanges, wherein one of the pair of flanges extends from the diffuser in a first direction and the other of the pair of flanges extends from the shroud in the first direction, and the pair of flanges are in direct contact with one another;
attaching the diffuser to an intercase via a strut that is mounted as an aft-extending leg to a base of the intercase; and
coupling the diffuser to a transition duct via a sealing assembly, wherein the sealing assembly is configured to prevent air from passing through the sealing assembly while allowing relative motion to occur between the transition duct and the diffuser.

14. The method as claimed in claim 13, wherein attaching the diffuser comprises attaching a radial portion and an axial portion that is generally orthogonal to the radial portion, and wherein the sealing assembly is attached to the axial portion of the diffuser.

15. The method as claimed in claim 13, wherein the sealing assembly comprises at least one piston ring positioned in a cylinder, the piston ring configured to slide relative to a wall of the cylinder and prevent the air from passing while allowing the relative motion to occur.

16. The method as claimed in claim 13, further comprising forming an aperture in the strut and forming an axial pass-through in the diffuser, wherein air that passes through the aperture also passes through the axial pass-through but without mixing with air that passes through the diffuser and directly from the compressor.

17. The method as claimed in claim 16, further comprising:
attaching a non-load-bearing wall to the diffuser and to the strut, such that an enclosure is formed in part by the diffuser, the non-load-bearing wall, and the strut, and such that the air that passes through the aperture passes into the enclosure; and
positioning a thrust bearing aft of the centrifugal impeller, wherein a portion of the thrust bearing is structurally connected to the strut.

18. The gas turbine engine as claimed in claim 3, wherein the at least one piston ring includes two piston rings positioned side by side in the cylinder.

19. The gas turbine engine as claimed in claim 9, wherein the piston ring seal includes two piston rings positioned side by side in the cylinder.

20. The method as claimed in claim 15, wherein the sealing assembly includes two piston rings positioned side by side in the cylinder.

\* \* \* \* \*